United States Patent [19]

Mihara et al.

[11] Patent Number: 5,556,670
[45] Date of Patent: Sep. 17, 1996

[54] LIQUID CRYSTAL DISPLAY PANEL

[75] Inventors: Ichiro Mihara; Minoru Kumagai, both of Akishima; Kunpei Kobayashi, Fussa, all of Japan

[73] Assignee: Casio Computer Co., Ltd., Tokyo, Japan

[21] Appl. No.: 433,029

[22] Filed: May 3, 1995

Related U.S. Application Data

[63] Continuation-in-part of Ser. No. 134,322, Oct. 8, 1993, abandoned.

[30] Foreign Application Priority Data

Oct. 15, 1992 [JP] Japan .................................. 4-301524
Sep. 20, 1994 [JP] Japan .................................. 6-250138

[51] Int. Cl.6 .................................................. G02F 1/1339
[52] U.S. Cl. .................................. 428/1; 359/80; 359/81
[58] Field of Search ........................... 359/80, 81; 428/1

[56] References Cited

U.S. PATENT DOCUMENTS

| | | | |
|---|---|---|---|
| 4,401,537 | 8/1983 | Chern et al. | 359/80 |
| 4,469,410 | 9/1984 | Ikesue | 359/80 |
| 4,685,770 | 8/1987 | Baeger | 359/81 |
| 5,150,239 | 9/1992 | Watanabe et al. | 359/80 |
| 5,387,445 | 2/1995 | Horiuchi et al. | 359/80 |

*Primary Examiner*—Alexander S. Thomas
*Attorney, Agent, or Firm*—Frishauf, Holtz, Goodman, Langer & Chick

[57] ABSTRACT

A flexible liquid crystal display panel includes spacers and cross members which are prevented from moving and from exfoliating, respectively, even when a force is applied thereto. In this panel, upper and lower substrates have flexibility, and spacers coated with an adhesive are fixed to orientation films formed on the substrates, by means of the adhesive. Thus, even when a force is applied from the outside, the spacers are prevented from moving, and therefore the distance between the substrates can be kept constant and the display characteristics of the liquid crystal can be made uniform. Further, a sealing member interposed between the substrates has holes through which cross members are fitted. This means that the cross members are reinforced by the sealing member, and hence they can be prevented from exfoliating from the substrates, keeping good electrical connection.

5 Claims, 4 Drawing Sheets

LIQUID CRYSTAL DISPLAY PANEL

This application is a continuation-in-part under 37 CFR 1.62 of application Ser. No. 08/134,322, filed Oct. 8, 1993 now abandoned.

BACKGROUND OF THE INVENTION

1. Field of the Invention

This invention relates to a liquid crystal display panel.

2. Description of the Related Art

There is a conventional liquid crystal panel as shown in FIG. 8. This panel comprises lower and upper substrates 1 and 2 made of a resin such as polyethylene-terephthalate, polyethersulfone, or polyimide. The lower substrate 1 has a surface opposed to the upper substrate 2 and provided with lower electrodes 3 used for display and an orientation film 5, while the upper substrate 2 has a surface opposed to the lower substrate 1 and provided with an upper electrode 4 used for display and an orientation film 6. The electrodes 3 and 4 are made of e.g. ITO (Indium Tin Oxide). The substrates 1 and 2 are attached with each other with a sealing member 7 of an epoxy resin interposed therebetween, thereby forming a liquid crystal-filled space which is filled with liquid crystal 8. A plurality of spacers 9 having a predetermined size and made of a resin or glass are arranged between the substrates 1 and 2 such that the distance therebetween is kept at a constant value so as to make uniform the display characteristics of the liquid crystal 8.

Further, in the above display device, one end of the lower substrate 1 projects laterally from corresponding one end of the upper substrate 2, and a plurality of electrodes made of e.g. ITO and to be connected to external elements are provided only on the upper surface of that projecting portion of the lower substrate 1 which is located outside the liquid crystal-filled space. Specifically, electrodes (not shown) directly connected to the lower electrodes 3 and an upper substrate-connecting electrode 10 are provided on the upper surface of the projecting portion of the lower substrate 1. A connecting electrode 11 made of ITO, etc., directly connected to the upper electrode 4 is provided on the lower surface of that end of the upper substrate 2 which is opposed to the projecting portion and located outside the liquid crystal-filled space. The electrodes 10 and 11 are opposed to each other, and connected to each other by means of a cylindrical cross member 12 made of silver paste, etc., and formed on the upper surface of the electrode 10 by printing.

Since in the above liquid crystal display panel, resin substrates 1 and 2 have flexibility differing from a hard substrate made of glass, etc., they can be easily deflected or deformed when they receive a force from the outside, and hence have the following problems:

When the substrates 1 and 2 are deflected or deformed by a force from the outside, the spacers 9 may be displaced together with the liquid crystal 8 and the distribution of the spacers 9 be varied, since the spacers 9 are roughly interposed between the orientation films 5 and 6 of the substrates 1 and 2. As a result, the distance between the substrates 1 and 2 may be made non-uniform, thereby causing the display characteristics of the liquid crystal 8 to be non-uniform and degrading the quality of display.

Further, since the degree of adhesiveness of the cross member 12 made of silver paste, etc., to the electrodes 10 and 11 made of ITO is low, the upper portion of the member 12, for example, may exfoliate from the electrode 11, causing degraded connection, when the substrates 1 and 2 are deflected or deformed by a force from the outside.

SUMMARY OF THE INVENTION

The invention has been developed in light of the above circumstances, and its object is to provide a liquid crystal display panel equipped with spacers which will not be displaced and with a cross member which will not exfoliate even when a force is applied to the panel from the outside.

According to the present invention, there is provided a liquid crystal display panel comprising:

first and second flexible substrates, the substrates facing each other;

first and second conductive layers, the conductive layers respectively being disposed on respective innerfaces of the respective substrates;

first and second orientation layers, the orientation layers respectively being disposed on the first and second conductive layers;

a sealing member interposed between the first and second substrates for sealing perimeters of the first and second substrates together to define a cavity between the first and second substrates, the sealing member having a hole formed in the sealing member and being formed of a material whose curing reaction proceeds at a room temperature;

a plurality of spacers interposed in the cavity defined between the first and second substrates, each of the spacers being brought into contact with the first and second orientation layers and being fixed to the first and second orientation layers by an adhesive agent which is made of a material selected from the group consisting of a thermoplastic resin and a thermosetting resin and which is respectively formed over a surface of each the spacer;

a connecting member connecting the first and second conductive layers, the connecting member being formed in the hole of the sealing member; and a liquid crystal material filled in the cavity defined between the first and second substrates.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1A–6 show one embodiment of the present invention; wherein

FIG. 1(*a*) is a cross sectional view, showing a liquid crystal display panel according to the one embodiment of the present invention;

FIG. 1(*b*) is a plan view, showing the liquid crystal display panel of FIG. 1(*a*);

FIG. 2 is a cross sectional view, showing an electrode used for display, an electrode to be connected to an external element, and an orientation film which are formed on the upper surface of a lower base film;

FIG. 3 is a cross sectional view, showing a cross member formed on the upper surface of the lower base film of FIG. 2;

FIG. 4 is a cross sectional view, showing spacers coated with an adhesive and arranged on the upper surface of the lower base film of FIG. 3;

FIG. 5 is a cross sectional view, showing an upper base film which has an electrode used for display, an electrode to be connected to an external element, an orientation film, and a sealing member formed on the lower surface thereof, and is positioned above the lower base film of FIG. 4;

FIG. 6 shows the upper and lower base films of FIG. 5 adhered to each other with the sealing member interposed therebetween;

DETAILED DESCRIPTION OF THE PREFERRED EMBODIMENTS

The embodiment of the invention will be explained with reference to the accompanying drawings.

Figure 1A:
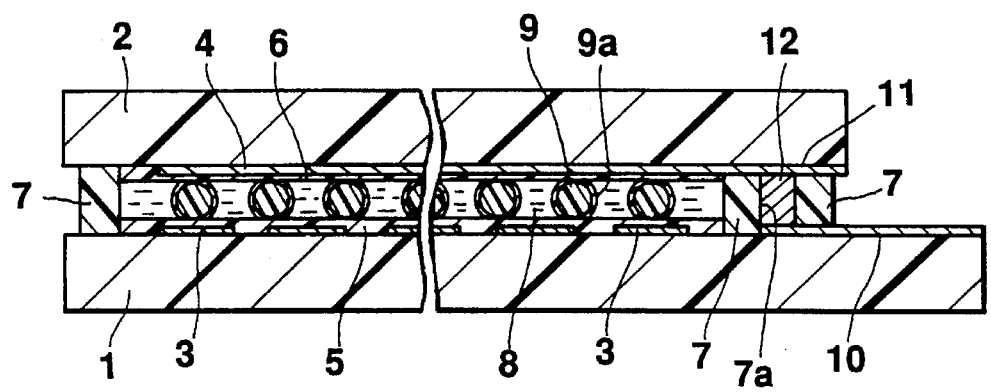

FIG. 1(a) shows a liquid crystal display panel according to an embodiment of the invention. Ball-like spacers 9 employed in the panel are the same size and wholly coated with an adhesive 9a having the same thickness and made of a thermoplastic resin or a thermosetting resin. As will be explained later, when pressure and heat is applied to the panel, those portions of the adhesive 9a which face orientation films 5 and 6 of substrates 1 and 2 are melted and moved, thereby exposing corresponding surface portions of the spacers 9 and bringing them into contact with the orientation films 5 and 6. Thereafter, the melted and moved adhesive 9a is cooled and hardened to fix the spacers 9 on the orientation films 5 and 6. In this case, the spaces 9 have a diameter of, for example, 2–10 μm, and the adhesive 9a has a thickness of 0.05–0.10 μm.

Figure 1B:
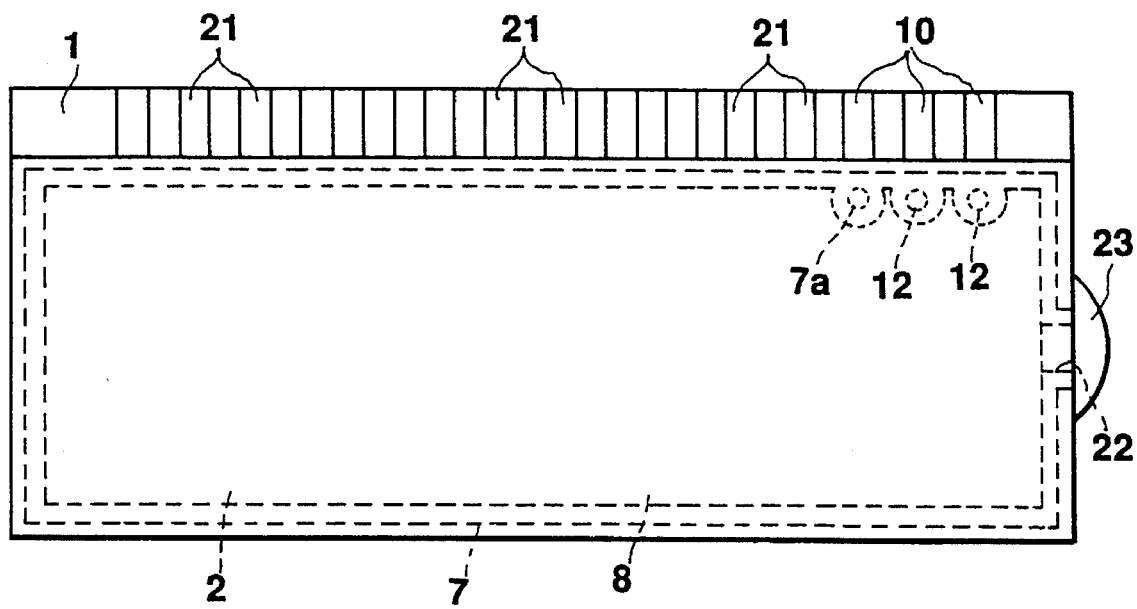

In the liquid crystal display panel, a liquid crystal-filled space is defined by the films 5 and 6a and a sealing member 7. The sealing member 7 has holes 7a through which cross members 12 are fitted. In other words, the sealing member 7 surrounds the cross members 12 in contact therewith. FIG. 1(b) is a plan view of the liquid crystal display panel shown in FIG. 1(a). Then, explanation will be given with reference to FIGS. 1(a) and 1(b). Three upper-substrate-connecting electrodes 10 to be connected to external elements are provided on that portion of the lower substrate 1 which is located outside the liquid crystal-filled space and on the right side end in FIG. 1(b), and a plurality of lower-substrate-connecting electrodes 21 directly connected to lower electrodes 3 used for display are provided near to the left side end. Further, a connecting electrode 11 directly connected to an upper electrode 4 used for display is provided on that portion of the lower surface of an end of the upper substrate 2 which faces the upper-substrate-connecting electrodes 10 and is located outside the liquid crystal-filled space. The sealing member 7 has holes 7a, through which the cross members 12 are fitted, formed in portions thereof corresponding to the three upper-substrate-connecting electrodes 10. The cross members 12 connect the electrodes 10 to the connecting electrode 11 opposed thereto. Thus, the electrodes 10 provided on the lower substrate 1 are connected to the electrode 4 provided on the upper substrate 2. A liquid crystal injecting inlet 22 is formed in a predetermined portion of the sealing member 7, and sealed by a member 23 after the liquid crystal 8 is injected therein.

Figure 2:
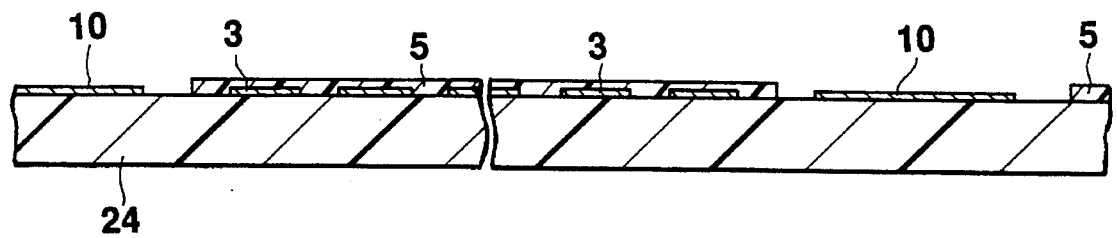

Then, a method for manufacturing the above liquid crystal display panels will be explained with reference to FIGS. 2–6. Referring first to FIG. 2, an elongated lower base film 24 is prepared to produce many lower substrates 1. The lower electrodes 3, upper-substrate-connecting electrodes 10, and lower-substrate-connecting electrodes 21 (FIG. 1(b)), which are made of ITO, etc., are formed on the upper surface of the lower base film 24 by photolithography. The lower base film 24 is made of a resin such as polyethyleneterephthalate, polyethersulfone, or polyimide. Thereafter, an orientation member made of polyimide, etc., is coated by relief printing on that predetermined portion of the film 24 which contains the lower electrodes 3, and annealed. Subsequently, a predetermined orientation treatment is made to the resultant structure, thereby obtaining the lower orientation film 5.

Figure 3:
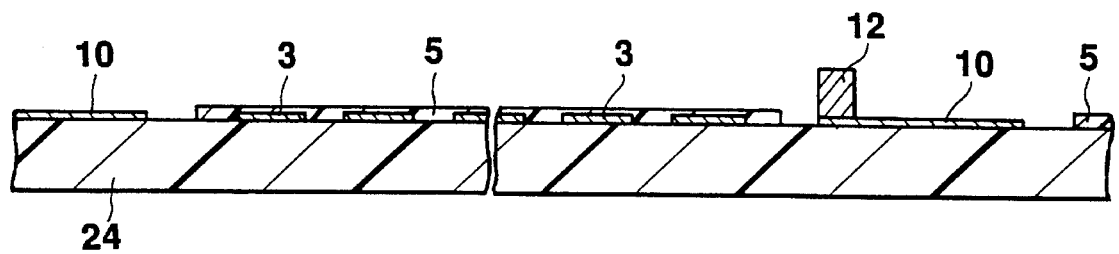
Figure 4:
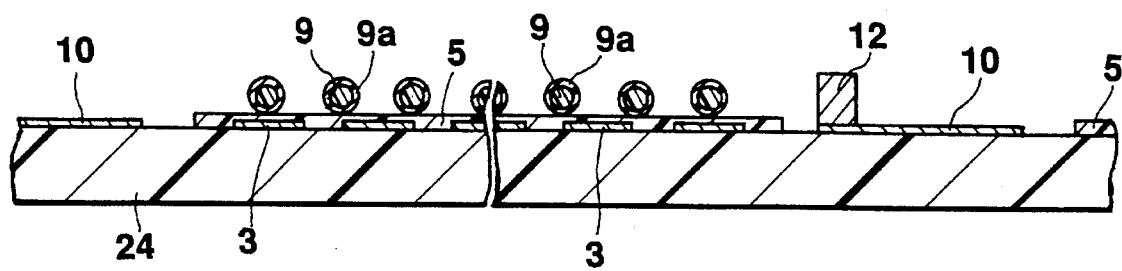

Then, as is shown in FIG. 3, a cylindrical cross member 12 made of silver paste which contains silver powder, etc., is formed by screen printing on a predetermined portion of the upper-substrate-connecting electrode 10. Thereafter, as is shown in FIG. 4, the ball-like spacers 9 wholly coated with an adhesive 9a are dispersed on the lower orientation film 5 by use of a spray, etc.

The adhesive 9a coating the surfaces of the spacers 9 is made of a thermoplastic resin or a thermosetting resin. Therefore, the spacers 9 are never adhered or stacked with each other at a room temperature.

When the liquid crystal 8 used in the liquid crystal display panel is of a TN (twisted nematic) type, the spacers 9 are distributed at a rate of 100–500/mm$^2$, and when the liquid crystal 8 is of an STN (super twisted nematic) type, the spacers 9 are distributed at a rate of 1,000–2,000/mm$^2$.

Figure 5:
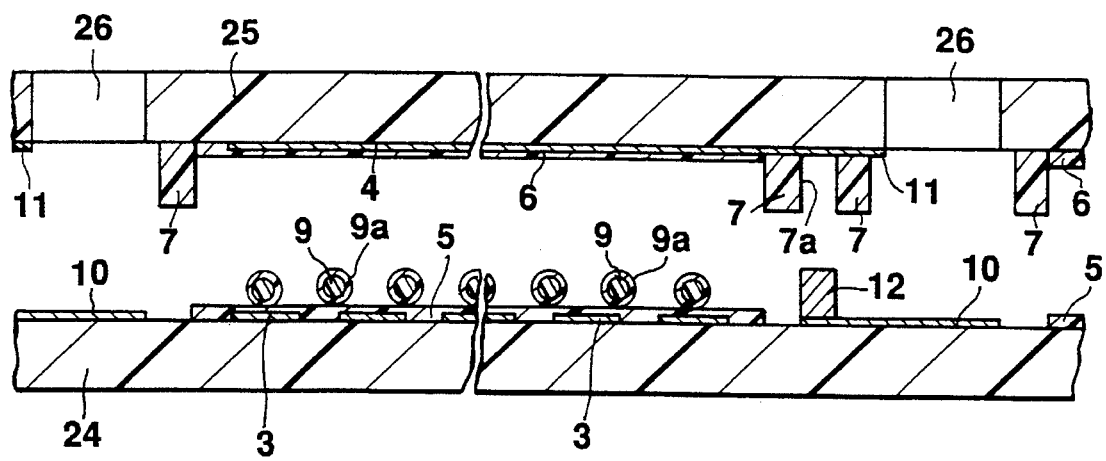

Subsequently, as is shown in FIG. 5, an elongated upper base film 25 is prepared to produce many upper substrates 2, and positioned above the lower base film 24. The lower surface of the upper base film 25 is beforehand subjected to a predetermined treatment. Specifically, the upper electrode 4, and connecting electrodes 11, which are made of ITO, etc., are formed on the lower surface of the upper base film 25 by photolithography. Thereafter, an orientation member made of polyimide, etc., is coated by relief printing on that predetermined portion of the film 25 which contains the upper electrode 4, and annealed. Subsequently, a predetermined orientation treatment is made to the resultant structure, thereby obtaining the upper orientation film 6. Further, the sealing member 7 which has the holes 7a receiving the cross members 12 and the liquid crystal injecting inlet 22 (see FIG. 1(b)) are provided by screen printing on that portion of the lower surface of the upper base film 25 which surrounds the upper orientation film 6. The sealing member 7 is made of a thermosetting epoxy resin of a one-pack type whose curing reaction proceeds at a high temperature. In addition, slits 26 are formed in the upper base film 25 at locations which enable each liquid crystal-filled space to be defined.

Figure 6:
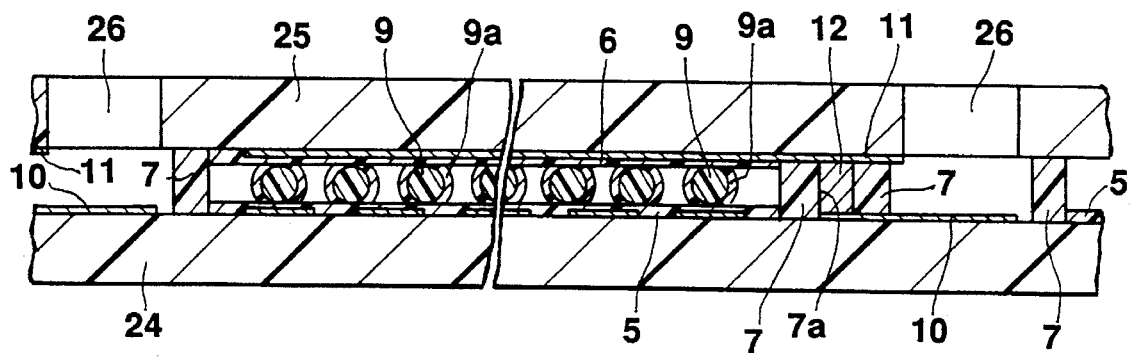
Figure 8:
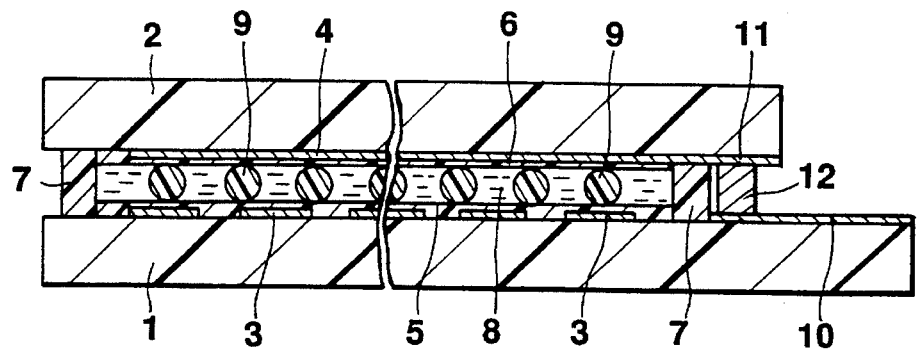
FIG. 8 shows a cross sectional view of a conventional liquid crystal display panel.

Thereafter, as is shown in FIG. 6, the base films 24 and 25 are attached to each other with the sealing member 7 interposed therebetween. Specifically, heat and pressure is applied to the base films 24 and 25 from downward and upward, respectively, to attach them to each other. At the same time, the cross members 12 are fitted into the holes 7a of the sealing member 7. In other words, the sealing member 7 surrounds the cross members 12 in contact therewith. The temperature at this heat and pressure application process is set between 140°–150° C. for 2–5 hours, thereby curing the sealing member 7. The upper-substrate-connecting electrodes 10 are connected to the connecting electrode 11 by means of the cross members 12 fitted in the holes 7a. Further, those portions of the adhesive 9a which face orientation films 5 and 6 of substrates 1 and 2 are melted and moved by the heat and pressure, thereby exposing corresponding surface portions of the spacers 9 and bringing them into contact with the orientation films 5 and 6. Thereafter, the melted and moved adhesive is cooled and hardened to fix the spacers 9 on the orientation films 5 and 6. Thus, the final distance between the orientation films 5 and 6 is set substantially the same as the diameter of the spacers 9.

Then, the upper and lower base films 24 and 25 are cut at the right ends of the slits 26 to separate each liquid crystal cell. Lastly, as is shown in FIGS. 1(a) and 1(b), the liquid crystal 8 is injected into each cell through the liquid crystal injecting inlet 22, which is then sealed by the member 23 made of a photo-curing resin, etc., thus producing the liquid crystal display panel of the invention.

Although in the above-described embodiment, the sealing member 7 is made of a one-pack type epoxy resin whose curing reaction proceeds at a high temperature, the material of the sealing member 7 is not limited to such specific materials. A material which cures at a room temperature may be used to form the sealing member 7. A two-pack type epoxy resin consisting of a main agent (a resin) and a curing agent initially separated from the main agent can be used as such a material for the sealing member 7. The curing agent contains a small amount of catalyst for making the main agent to cure at a high temperature, or contains a catalyst for making the main agent to cure at a room temperature. The curing agent is mixed with the main agent immediately before use.

In the case of using material which cures at a room temperature to form the sealing member 7, both the base films 24 and 25 are superposed with the sealing member 7 interposed therebetween, and left as they are at a room temperature of 20°–30° C. for 40–60 hours or at a temperature of 40°–60° C. for 10–20 hours while being pressed together. As a result, the sealing member 7 enters a gel state, i.e., the sealing member 7 becomes in a semi-cured state. Thereafter, the sealing member 7 is made to be at a fully cured state at a temperature of 120°–150° C. for 2–5 hours. In this two-step method, the base films 24 and 25 are adhered to each other at a room temperature or at a temperature of 40°–60° C. by means of the semi-cured sealing member 7. Therefore, during the following heat treatment for bringing the sealing member 7 at a fully cured state, the liquid crystal display device is prevented from being warped due to the shape of the base films 24 and 25 or due to the difference in the thermal expansion coefficients of the material of the base films 24 and 25.

Moreover, although in the described embodiment, the cross members 12 are made of silver paste, they may be made of another material.

Figure 7:
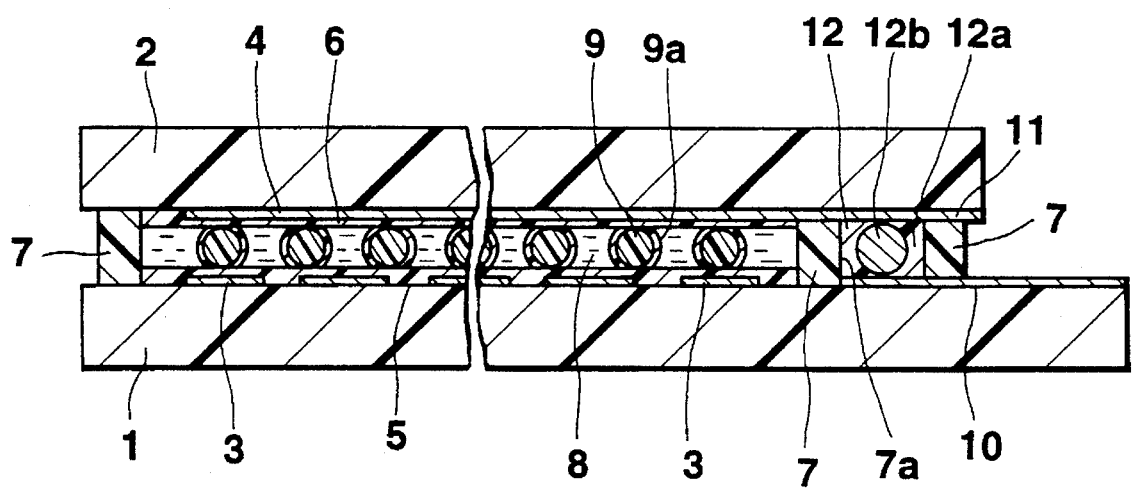
FIG. 7 is a cross sectional view of a liquid crystal display panel according to another embodiment of the present invention.

As is shown in FIG. 7, the cross member 12 may be made of a mixture of a thermosetting resin 12a and conductive particles 12b in a further embodiment. In this case, the cross member 12 is made cured not in the semi-curing process of the sealing member 7, but in the fully curing process of the cross member 12 at a temperature of 120°–150° C.

As explained above, since in the liquid crystal display panel of the embodiment, the spacers 9 are adhered to the orientation films 5 and 6 of the substrates 1 and 2 by means of the adhesive 9a coated on the spacers 9, they are prevented from moving even when they receive a force from the outside, so that the distance between the substrates 1 and 2 can be kept at a constant value in a reliable manner and accordingly the display characteristics of the liquid crystal 8 can be made uniform. Moreover, since the sealing member 7 surrounding the cross members 12 in contact therewith reinforces them, the cross members 12 are prevented from exfoliating from the substrates, keeping good electrical connection.

Additional advantages and modifications will readily occur to those skilled in the art. Therefore, the invention in its broader aspects is not limited to the specific details, and representative devices examples shown and described herein. Accordingly, various modifications may be made without departing from the spirit or scope of the general inventive concept as defined by the appended claims and their equivalents.

What is claimed is:

1. A liquid crystal display panel comprising:

first and second flexible substrates, said substrates facing each other;

first and second conductive layers, said conductive layers respectively being disposed on respective innerfaces of said respective substrates;

first and second orientation layers, said orientation layers respectively being disposed on said first and second conductive layers;

a sealing member interposed between said first and second substrates for sealing perimeters of said first and second substrates together to define a cavity between said first and second substrates, said sealing member having a hole formed in said sealing member and said sealing member being formed of a material whose curing reaction proceeds at a room temperature;

a plurality of spacers interposed in the cavity defined between said first and second substrates, each of said spacers being brought into contact with said first and second orientation layers and being fixed to said first and second orientation layers by an adhesive agent which is made of a material selected from the group consisting of a thermoplastic resin and a thermosetting resin and which is respectively formed over a surface of each said spacer;

a connecting member connecting said first and second conductive layers, said connecting member being formed in the hole of said sealing member and said connecting member being made of a thermosetting resin in which conductive particles are dispersed, and wherein said thermosetting resin of said connecting member is a material whose curing reaction proceeds at a higher temperature than said room temperature; and a liquid crystal material filled in the cavity defined between said first and second substrates.

2. A liquid crystal display panel according to claim 1, wherein said spacers are arranged in said cavity at a rate of 100–500/mm².

3. A liquid crystal display panel according to claim 1, wherein said spacers are arranged in said cavity at a rate of 1000–2000/mm².

4. A liquid crystal display panel according to claim 1, wherein at least one of said first and second substrates is made of any one of polyethyleneterephthalate, polyethersulfone and polyimide.

5. A liquid crystal display panel according to claim 1, wherein said curing reaction of said thermosetting resin of said connecting member proceeds in a temperature range of from 120°–150° C.

* * * * *